United States Patent [19]

Callemyn

[11] Patent Number: 5,115,507

[45] Date of Patent: May 19, 1992

[54] SYSTEM FOR MANAGEMENT OF THE PRIORITIES OF ACCESS TO A MEMORY AND ITS APPLICATION

[75] Inventor: Jean-Michel Callemyn, Nogent sur Marne, France

[73] Assignee: U.S. Philips Corp., New York, N.Y.

[21] Appl. No.: 675,028

[22] Filed: Mar. 25, 1991

Related U.S. Application Data

[63] Continuation of Ser. No. 288,540, Dec. 21, 1988, abandoned.

[30] Foreign Application Priority Data

Dec. 23, 1987 [FR] France ............................. 87 18943

[51] Int. Cl.$^5$ ............................................. G06F 9/46
[52] U.S. Cl. ................................... 395/725; 364/242.6;
364/242.8; 364/242.9; 364/242.91; 364/254;
364/254.3; 364/DIG. 1
[58] Field of Search ... 364/200 MS File, 900 MS File

[56] References Cited

U.S. PATENT DOCUMENTS

| | | | |
|---|---|---|---|
| 3,925,766 | 12/1975 | Bardotti et al. | 364/200 |
| 4,443,848 | 4/1984 | Gehman | 364/200 |
| 4,493,036 | 1/1985 | Boudreau et al. | 364/200 |
| 4,755,938 | 7/1988 | Takahashi et al. | 364/200 |
| 4,788,640 | 11/1988 | Hansen | 364/200 |

FOREIGN PATENT DOCUMENTS 2231050 12/1974 France .
2593304 7/1987 France .
1269301 4/1972 United Kingdom .

OTHER PUBLICATIONS

Communication from the European Patent Office dated Feb. 21, 1989 in EP8802954.9, a corresponding application.
Communication from the European Patent Office dated Feb. 2, 1989 in a corresponding application.
Siddique "100-MHz DRAM Controller Sparks Multiprocessor Designs", Electronic Design, Sep. 18, 1986, pp. 138-141.
Amos et al., "Dynamic Storage Priority Control", IBM TDB vol. 20, No. 10, Mar. 1978, p. 4033.

*Primary Examiner*—Thomas C. Lee
*Assistant Examiner*—William M. Treat
*Attorney, Agent, or Firm*—Lesley Rhyne

[57] ABSTRACT

The management of the priorities of access to a memory is characterized in that each request generator module (DP,GP) separately formulates the requests for access to a single word (DPREQ1, GPREQ1) and the requests for access to a plurality of words (DPREQN, GPREQN); differing priorities (REGA, REGB, REGC, REGD) may then be allocated (VALREG) to each type of request. Advantageously the requests for a single word are arbitrated by a first module which transmits a selected request to a second module.

9 Claims, 3 Drawing Sheets

SYSTEM FOR MANAGEMENT OF THE PRIORITIES OF ACCESS TO A MEMORY AND ITS APPLICATION

This is a continuation of application Ser. No. 288,540, filed Dec. 21, 1988, now abandoned.

The present invention relates to a system for management of the priorities of access to a memory, comprising at least one request generator module provided with means for emitting requests for access, an arbitration module to arbitrate between the said requests for access and thus to elect a request for access to be executed with priority.

Such a system is well known in the data processing industry, where it frequently occurs that the resources of a memory are apportioned between a plurality of request generators; the request generators formulate requests for access which may be simultaneous, while their execution cannot be so.

Such a system is used, in particular, in a graphics system, comprising a dynamic random access memory DRAM storing pixels.

A known priority logic system is described in U.S. Pat. No. 4,788,640; in such a system, each request generator module successively emits requests for access, each request for access having a priority which is unique but variable in time, especially as a function of the duration of the request as detected by the said arbitration module.

The arbitration module thus described is complex, both with regard to its production, and thus to its cost, and also with regard to its implementation, since a same request is therein provided with a variable priority, of which it is not a simple matter to know the impact on the performance levels of the system.

The object of the present invention is to eliminate this disadvantage.

To this end, a system for the management of the priorities is particularly noteworthy in that each request generator module is provided with means for separately emitting, on the one hand, the requests for access to a single word of the said memory and, on the other hand, the requests for access to a plurality of consecutive words of the said memory, and that the arbitration module is provided with means for receding and arbitrating the said requests for access with distinct priorities, even if they emanate from the same request generator module.

Thus, each type of request is formulated separately and a priority can be allocated to each type, depending upon whether what is involved is the type concerned with a single word or the type concerned with a plurality of words. The arbitration module is simpler to construct, since it no longer includes a block detector as described in the patent application which has already been mentioned.

The present invention may be implemented advantageously either with priorities which are programmed, that is to say modifiable during the operation of the system, or with priorities which are pre-programmed, or wired, that is to say non-modifiable during the operation of the system.

In the case where the priorities are wired, it is thus possible to cause an external clock signal to participate in order to automatize the management of the priorities.

In a preferred mode, the arbitration module comprises, on the one hand, a first module to arbitrate the requests for access to a single word and thus to preselect such a request and, on the other hand, a second module to arbitrate between the said preselected request and requests for access to a plurality of words and thus to elect a request for access to be executed.

Thus, a prearbitration is executed and the second arbitration module can operate all the faster; this is favourable in the case of the reading in bursts of pixels to be displayed.

In the case of a DRAM as mentioned above, the refresh requests can advantageously be arbitrated by the said second module.

The present invention will be better understood with the description of various embodiments which are set forth with reference to the accompanying drawings.

BRIEF DESCRIPTION OF THE DRAWINGS

FIG. 1a represents a priority logic system similar to that of the patent already mentioned and included herein by reference in order to avoid over-loading the present description.

The essential difference resides in the fact that each request generator module comprises two request connections to formulate, on the one hand, the requests for access to a single word (DP.REQ1, GP.REQ-1, etc ... ) and, on the other hand, the requests for access to a plurality of words, or by blocks (DP.REQ-N, GP.REQN, etc ... ). If a module emits only a single type of request, a single connection is sufficient (CPU-REQ-1). The priority logic circuit (CLP) comprises as many registers (REGA, REGB, ... REGI) as there are request inputs; these registers operate as in the patent already mentioned but they are clearly not dissociated and a single priority value is allocated to each connection at the input; as previously, this value can be modified by a command (VAL-REG) even during the operation of the system; depending upon the priorities, a request to be executed (REQ.EX) is selected by the system.

Figure 1A:
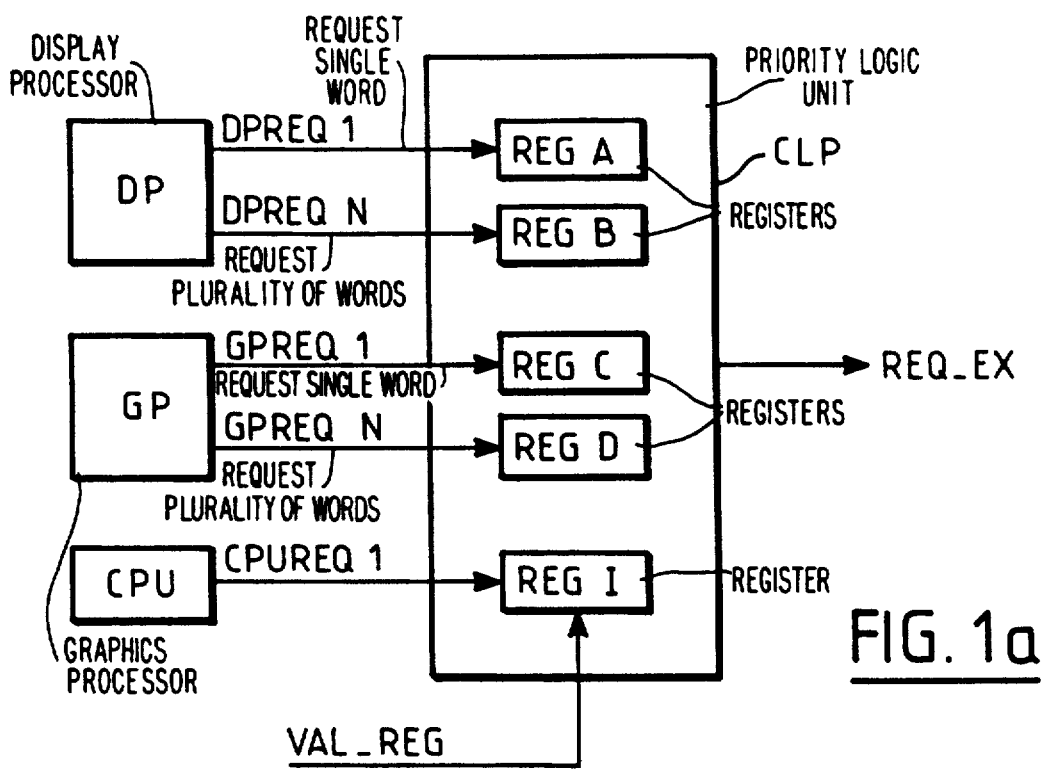
FIGS. 1a and 1b represent two modes of implementation.
Figure 1B:
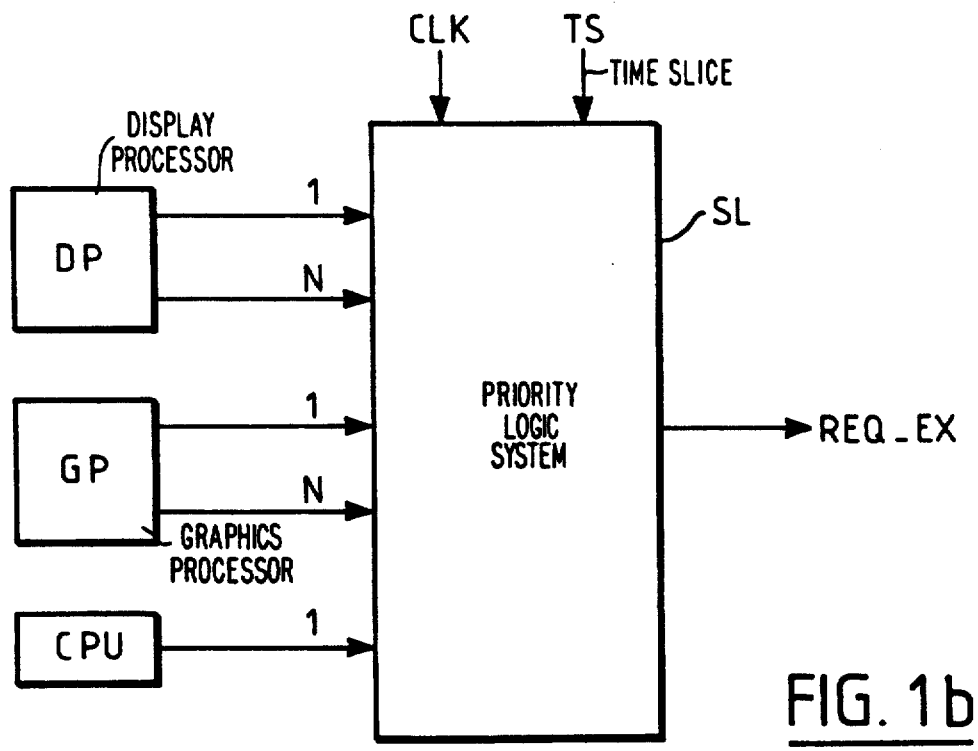

In FIG. 1b, a similar management system is represented; the request generator modules comprise two further connections to formulate separately each type of request; on the other hand, the priority logic system (SL) consists of a system of logic gates which is not modifiable on account of the fact that it is wired; the priorities are therefore fixed once and for all, but it is possible to act on the gates with a time signal, for example the clock (CLK) or, in a preferred mode, with a time slice signal (TS) which is appropriately chosen; the TS signal may, for example, represent the display period and/or the line return period of the screen of a graphics system; in this case, it is clear to a person skilled in the art that, following the period in progress, the various access request generator modules may advantageously be equipped with differing priorities; it is then a matter for a person skilled in the art to arrange the logic gates in consequence of his choices of design and of operation of the system; the TS signal may also represent, or be combined with, the frame return signal; these examples of time slicing (TS) are clearly not limiting.

Figure 2:
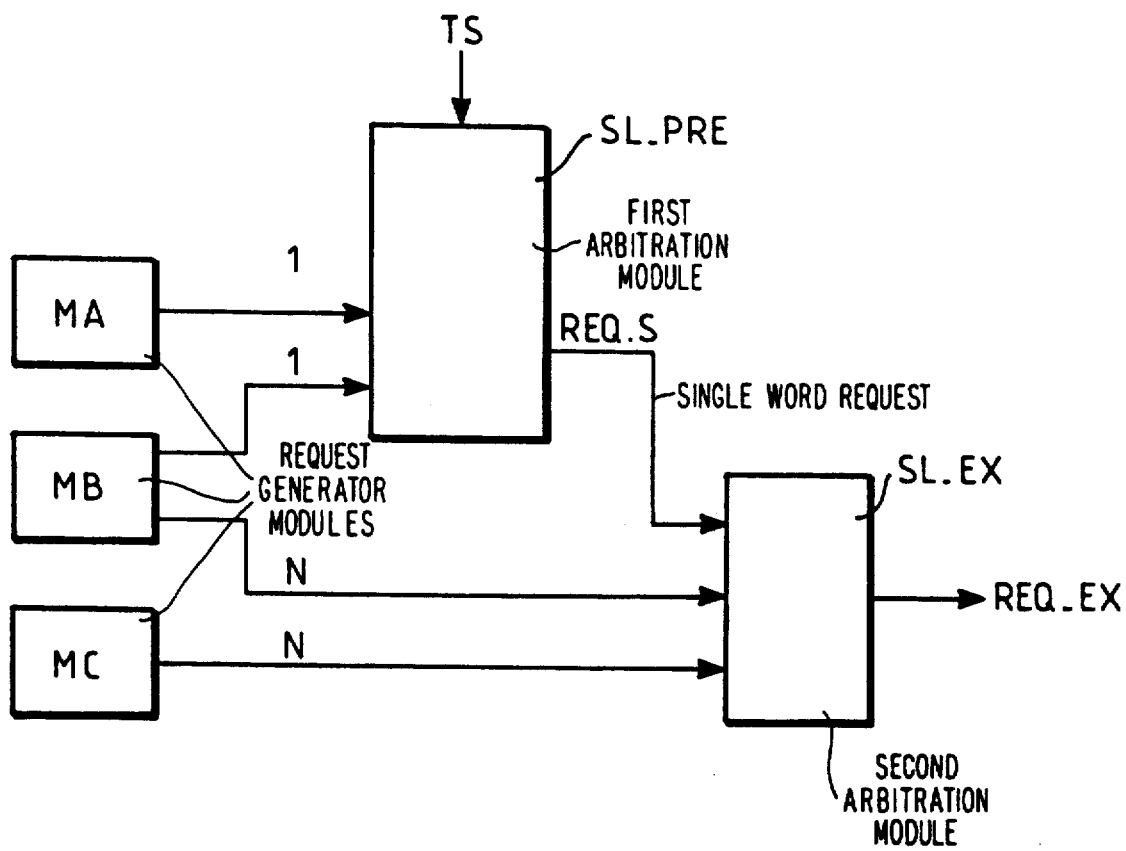
FIG. 2 represents the breakdown of the arbitration module.

In FIG. 2 the arbitration module has been divided into two parts.

A first module (SL-PRE) receives and arbitrates exclusively the requests for access to a single word to preselect one of them (REQ-S), which is transmitted to the second arbitration module; the second module (SL.EX) receives and arbitrates the said preselected request and the request(s) for access to a plurality of words to elect a request to be executed; each of the two arbitration modules may independently be either programmable or wired as mentioned above.

Figure 3:
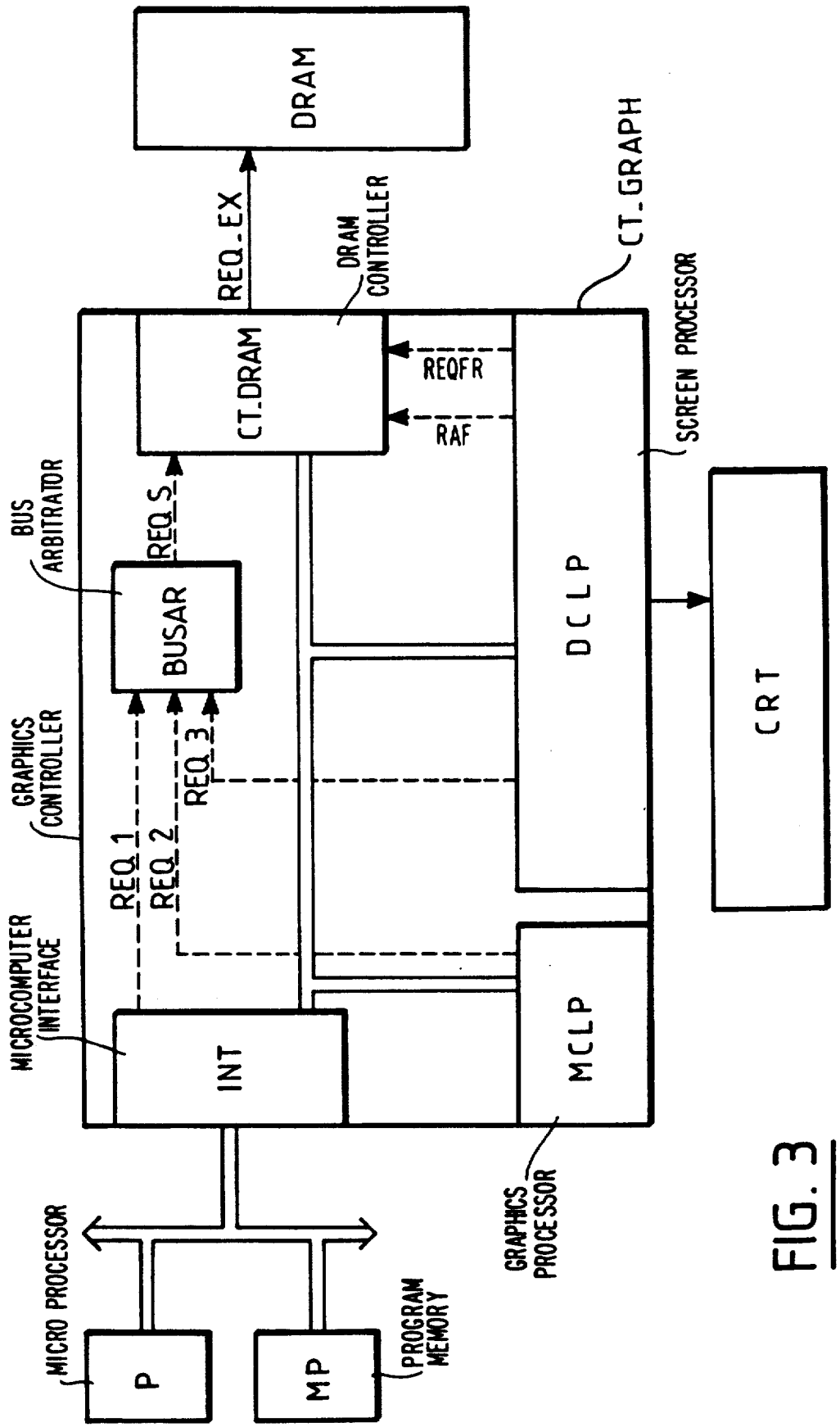
FIG. 3 represents the application of the invention to a graphics system.

This particular arrangement gives an especially good performance level in a graphics system as shown in FIG. 3.

The graphics system comprises, connected to one another by data, control and address buses which have been succinctly represented, a control microcomputer consisting of a microprocessor (P) with its programme memory (MP) for controlling the system, a graphics visual display screen (CRT), a dynamic random access memory (DRAM) to store the display information words for the windows of the lines of the screen, the said DRAM having to be refreshed periodically, and a graphics controller (CT-GRAPH) comprising a microcomputer interface (INT), a graphics processor (MCLP) and screen processor (DCLP).

The abovementioned first arbitration module is in this case referred to as bus arbitrator (BUSAR); it arbitrates the requests for a single word (REQ1, REQ2, REQ3) originating from the microcomputer (P), from the graphics processor (MCLP) and from the screen processor (DCLP), and it preselects a request (REQ.S).

The abovementioned second arbitration module is, in this case, integrated in the DRAM controller (CT.DRAM); it arbitrates the said request (REQ.S) and the requests for access in bursts (RAF) to a plurality of words, as well as the refresh requests (REQ-FR) originating from the screen processor (DCLP), and it elects a request to be executed (REQ.EX).

The device arranged in this way is well suited to the process of displaying the pixels which is driven by the DCLP; in fact, the said process comprises, on the one hand, a preparatory reading of a descriptor word (REQ.3) in which information items which are necessary for the reading per se of the pixels (RAF) are situated; it is therefore of importance to give a high priority to REQ3 during the display period, and this is possible with the described device by arranging the bus arbitrator (BUSAR) in accordance with the description of FIG. 1b.

The graphics system is thus optimized; this embodiment is not limiting, and a person skilled in the art may envisage other modes of implementation of the present invention depending upon the particular cases of access priority management which are presented to him.

What is claimed is:

1. System for management of access to a memory, the system comprising:
    a) at least one request generator module including means for emitting requests for access, and
    b) an arbitration module to arbitrate between the requests for access and thus to elect a request for access o be executed with priority,
    wherein
    c) at least one request generator module includes:
        i) first means for emitting requests for access to a single word of the memory; and
        ii) second means for emitting requests for access to a plurality of consecutive words of the memory,
        said first means for emitting being separate from said second means for emitting, and
    d) the arbitration module includes arbitration means, first receiving means for receiving requests from the first means for emitting, second receiving means for receiving requests from the second means for emitting, and means for detecting if a request originates from the first or second receiving means, whereby the requests for access to a single word are directly assigned priorities which are distinct from the priorities of the requests for access to a plurality of consecutive words, without decoding the requests, even if the requests emanate from the same request generator module.

2. System for management according to claim 1, wherein the distinct priorities are modifiable during the operation of the system.

3. System for management according to claim 1, wherein the distinct priorities are non-modifiable during the operation of the system.

4. System for management according to claims 1, 2 or 3, wherein the arbitration means comprises,
    a first module to arbitrate the requests for access to a single word and thus to preselect such a request, and
    a second module to arbitrate between the preselected request and the requests for access to a plurality of words and thus to elect a request for access to be executed.

5. System for management according to claim 1, 2, or 3, wherein:
    a) the memory is a DRAM requiring periodic refreshes, and
    b) the arbitration module further comprises means for receiving and arbitrating a refresh request, which refresh request is arbitrated as being a request for access to a plurality of consecutive words.

6. The system for management according to claim 5 wherein:
    a) the system is part of a graphics system; and
    b) the at least one request generator module comprises a display processor arranged to emit:
        i) requests for access to a single word, and
        ii) requests for access to a plurality of consecutive words,
    each said request for access to a single word being utilized to prepare a next reading of pixels, which reading is the subject of a request for access to a plurality of consecutive words.

7. System for management according to claim 4, wherein:
    a) the memory is a DRAM requiring periodic refreshes, and
    b) the arbitration module further comprises means for receiving and arbitrating a refresh request, which refresh request is arbitrated as being a request for access to a plurality of words.

8. The system for management according to claim 7 wherein:
    a) the system is part of a graphics system; and
    b) the at least one request generator module comprises a display processor arranged to emit:
        i) requests for access to a single word, and
        ii) requests for access to a plurality of consecutive words,
    each said request for access to a single word being utilized to prepare a next reading of pixels, which reading is the subject of a request for access to a plurality of consecutive words.

9. The system of claim 4, wherein:
the first arbitration module arbitrates the requests for access to a single word from all request generator modules; and
the second arbitration module arbitrates the requests for access to a plurality of consecutive words form all request generator modules.

* * * * *